(12) United States Patent
Shimada et al.

(10) Patent No.: US 6,647,442 B1
(45) Date of Patent: Nov. 11, 2003

(54) DATA PROCESSING DEVICE

(76) Inventors: Mitsuru Shimada, #305, 1229-1 Takata-cho, Kohoku-ku, Yokohama-shi, Kanagawa 223-0063 (JP); Shinichirou Ikoma, #402, 1-32-12 Hiyoshihoncho, Kohoku-ku, Yokohama-shi, Kanagawa 223-0062 (JP); Atsushi Takegami, #3-102, 22-3 Okazawa-cho, Hodogaya-ku, Yokohama-shi, Kanagawa 240-0062 (JP); Sachiko Oda, 5-7-3 Shodo, Sakae-ku, Yokohama-shi, Kanagawa 247-0022 (JP)

( * ) Notice: Subject to any disclaimer, the term of this patent is extended or adjusted under 35 U.S.C. 154(b) by 0 days.

(21) Appl. No.: 09/457,499

(22) Filed: Dec. 8, 1999

(30) Foreign Application Priority Data

Dec. 8, 1998 (JP) .......................................... 10-347695

(51) Int. Cl.[7] ................................................ G06F 3/00
(52) U.S. Cl. ............................. 710/52; 710/53; 710/57
(58) Field of Search ............................. 710/53, 56, 57, 710/52, 29; 370/426, 235

(56) References Cited

U.S. PATENT DOCUMENTS

| | | | |
|---|---|---|---|
| 5,179,661 A | * | 1/1993 | Copeland et al. ............. 710/29 |
| 5,819,031 A | * | 10/1998 | Iwamoto ..................... 709/203 |
| 5,864,677 A | * | 1/1999 | Van Loo ...................... 370/403 |
| 5,961,623 A | * | 10/1999 | James et al. ................. 710/107 |
| 6,026,451 A | * | 2/2000 | Sreenivas .................... 710/29 |
| 6,067,408 A | * | 5/2000 | Runaldue et al. ........... 710/307 |
| 6,430,620 B1 | * | 8/2002 | Omura et al. ............... 709/231 |

* cited by examiner

Primary Examiner—Kim Huynh
Assistant Examiner—Harold Kim
(74) Attorney, Agent, or Firm—William B. Kempler; W. James Brady, III; Frederick J. Telecky, Jr.

(57) ABSTRACT

To avoid a reduction in the efficiency of data transmission of a data processing device that conducts data communications using a serial bus that conforms to the IEEE 1394 Standards.

The data processing device 1 has a calculator 9 and a comparator 8. The calculator 9 calculates the data volume of a response packet intended for reception that corresponds to a request packet intended for transmission when an attempt is made to transmit these packets, the comparator 8 compares the data volume of the response packet intended for reception and the empty volume of the receiving buffer 7, and when the empty volume of the receiving buffer 7 is smaller than the data volume of the response packet intended for reception, the packet transmitting device 3 does not transmits the request packet intended for transmission to the IEEE 1394 bus 6, and if the empty volume of the receiving buffer is too small and the response packet cannot be received, the request packet is not transmitted.

4 Claims, 4 Drawing Sheets

DATA PROCESSING DEVICE

FIELD OF THE INVENTION

The present invention a concerns data processing device, particularly a data processing device that is used in a system that transmits and receives data packets by means of a serial bus that conforms to IEEE 1394 standards.

BACKGROUND OF THE INVENTION

In the past, in order to accept audio and video data, and control AV machines with a data processing device such as a personal computer, a separate video capture board, RS232C bus, etc. were required, and unified handling could not be done.

Thus, in recent years, standards suited to data transmission in the multimedia era have been proposed, for example, by means of "IEEE 1394 high-performance serial bus standards (hereinafter IEEE 1394 standards)," and environmental improvements have been made so as to be able to freely conduct high-speed, high-volume communication.

One example of a conventional data processing device is represented by reference numeral 101 in FIG. 4. This data processing device 101 conforms to IEEE 1394 standards and is connected to a serial bus (hereinafter IEEE 1394 bus) 106, via which the propagation of data packets is possible. A plurality of other data processing units are connected to this IEEE 1394 bus 106. The data processing device 101 transmits request packets to these other data processing devices by means of said IEEE 1394 bus 106 and is designed to receive a series of response packets corresponding to the request packets formed in the other data processing devices to which the request packets have been transmitted.

The aforementioned data processing device 101 has a packet processing device 102, a transmitting device 103, a packet receiving device 104, a transmitting buffer 105, and a receiving buffer 107. The transmitting device 103 is made up of a plurality of packet transmitting devices; here, three packet transmitting devices $103_1$–$103_3$.

The output of the packet processing device 102 is connected to the input of the transmitting buffer 105, and the output of the transmitting buffer 105 is connected to the input of the transmitting device 103, and the output of the transmitting device 103 is connected to the IEEE 1394 bus 106.

In the data processing device 101, in transmitting a request packet, first, the packet processing device 102 sequentially forms the request packets according to a prescribed program, and serially outputs them to the transmitting buffer 105. The transmitting buffer 105 is designed as a FIFO (first in, first out) memory for temporarily storing the request packets that are sequentially formed by the packet processing device 102.

Each packet transmitting device $103_1$–$103_3$ of the transmitting device 103 successively reads the request packets that are stored in the transmitting buffer 105 one at a time and transmits them to the IEEE 1394 bus 106.

When a request packet is sent to the IEEE 1394 bus 106, the other data processing device that is specified by the contents of the request packets becomes the data processing device of the other party and sequentially receives the request packets from the IEEE 1394 bus 106 and reads their contents. The data processing device of the other party reads the data specified in response to the contents of the request packets from a memory region which it itself has, attaches prescribed information to the data that was read, forms sequential response packets corresponding to the request packets, and sequentially transmits them to the IEEE 1394 bus 106.

The input of the packet receiving device 104 is connected to be IEEE 1394 bus 106, the input of the receiving buffer 107 is connected to the output of the packet receiving device 104, and the output of the receiving buffer 107 is connected to the input of the packet processing device 102.

When a response packet reaches the packet receiving device 104, the packet receiving device 104 determines whether the response packet is receivable as a function of the volume available in the receiving buffer 107. Here, the term "receive" refers to the time that the response packet reaches the packet receiving device 104 until it is stored in the receiving buffer 107.

Also, if there is space available in the receiving buffer 107 for storing a response packet, the packet receiving device 104 determines that it is possible to receive. The response packet is then output to the receiving buffer 107 via the IEEE 1394 bus 106.

The receiving buffer 107 temporarily stores the response packet that has been input, and outputs it to the packet processing device 102 in response to the requests of the packet processing device 102 that were read. When the response packet is output to the packet processing device 102, the region which that response packet had occupied is released.

The packet processing device 102 conducts such processes as storing the response packets that have been input to the prescribed memory devices.

When a response packet such as the one described above is received by the data processing device 101, an acknowledgement indicating "success" is returned to the data processing device of the other party, and the fact that the response packet was received is communicated the acknowledgement is made up of 4 bits and indicates whether each transaction was completed.

In the above-mentioned data processing device 101 shown in FIG. 4, the packet transmitting devices $103_1$ to $103_3$, after request packets are transmitted, enter a receive standby condition until response packets corresponding to those requests packets are received, and are designed not to transmit new request packets until the fact that a given response packet has been received is acknowledged at the packet receiving device 104 and communicated to each of the packet transmitting devices $103_1$ to $103_3$.

Also, each packet transmitting device $103_1$–$103_3$ is designed to be immediately return to a condition in which a new request packet can be transmitted after being released from the receive standby condition.

Thus, even if the empty volume of the receiving buffer 107 is small and the packet receiving device 104 cannot receive a response packet corresponding to a new request packet, there are cases when the packet transmitting devices ($103_1$ to $103_3$) transmit as many new request packets as possible.

Thus, because a response packet cannot be received, if a response packet arrives, the data processing device 101 returns a "busy" acknowledgement to the data processing device of the other party.

When a "busy" acknowledgement is returned, the data processing device of the other party retransmits (reattempts) the response packet, and the reattempt is repeated until the packet receiving device 104 can receive the response packet and a "successful" acknowledgement is returned, and when a "successful" acknowledgement is not returned, the reattempt is repeated only a prescribed number of times. Since the IEEE 1394 bus 106 is used wastefully during this interval, the efficiency of the data exchange is greatly lowered.

In particular, when the data processing device 101 has a plurality of packet transmitting devices $103_1$ to $103_3$ as shown in FIG. 4, and the response packets corresponding to the plurality of request packets are transmitted at one time to the IEEE 1394 bus 106, there were many instances when the sum of the data volumes of all of the response packets that were transmitted exceeded the available volume in the receiving buffer 107, and there were frequently instances when the packet receiving device 104 could not receive all of these response packets at one time.

The present invention was designed for the purpose of solving the above-mentioned problems of the prior art, and its purpose is to offer technology which can increase the efficiency for the data exchange if the exchange, of data is conducted in a data processing device that is connected to an IEEE 1394 bus.

SUMMARY OF THE INVENTION

In order to solve the above-mentioned problems, the data processing device of one aspect of the present invention has a transmitting device that is connected to the serial bus, and which transmits request packets via the above-mentioned serial bus, a receiving device that is connected to the above-mentioned serial bus, and which receives from the above-mentioned serial a response packet corresponding to the above-mentioned request packet, a receiving buffer that temporarily stores the response packet that is supplied from the above-mentioned receiving device, an evaluation unit that determines the relationship between the data volume of the response packet corresponding to the above-mentioned request packet and the available volume of the above-mentioned receiving buffer; wherein the above-mentioned transmitting device controls the transmission, via the above-mentioned serial bus, of the request packets in response to the results of the above-mentioned evaluation unit.

The data processing device of claim 2 is the data processing device of claim 1 with a plurality of the above-mentioned transmitting devices, wherein the above-mentioned evaluation unit determines the relationship between the total volume of the response packets corresponding to the request packets in the each of the above-mentioned transmitting devices and the volume available, and each of the above-mentioned transmitting devices control the transmission to the above-mentioned serial bus of the request packets in response to the results of the above-mentioned evaluation unit.

Also, the data processing device of claim 3 is the data processing device of another aspect, where the above-mentioned request packet, the above-mentioned response packet, and the above-mentioned serial bus are designed to conform to IEEE 1394 standards.

In the data processing device of the present invention, when the evaluation unit, based on the relationship between the data volume of the response packet corresponding to the request packet that is intended to be transmitted and the volume available in the receiving buffer, determines whether or not the transmission of the request packet intended to be transmitted is possible, and since, based on this decision, the transmitting device does not transmit the request packet that is intended for transfer, for example, when as a result of comparing the data volume of the response packet and the empty volume of the receiving buffer, it is found that the volume of the receiving buffer is too small so that the response packet cannot be received by the receiving device, and the transmitting device does not transmit the request packet intended for transfer then the transmitting device can be designed so that when the request packet intended to be transmitted is transmitted, as much as possible, an empty volume is set aside in the receiving buffer so that the response packet can always be received.

In this way, when the request packet that was intended to be transmitted is transmitted, it can always be made in a condition in which the reception of the response packet is possible.

Therefore, since the request packet intended to be transmitted is not transmitted when the empty volume of the receiving buffer is too small and the response packet cannot be received, reception is denied at the receiving device, and the serial bus is not used wastefully by repeated reattempts. Because of this, compared to the prior art the efficiency of the data exchange can be, increased.

Also, in the data processing device of the present invention, in addition to comparing the data volume of the response packet that corresponds to the request packet that is intended to be transmitted with the empty volume in the receiving buffer, by examining the data volume of the pending request packet, it can be determined whether transmission of the request packet that is intended for transmission is possible.

Thus, when the available volume in the receiving buffer is less than the sum of the data volume of the pending request packet and the data volume of the response packet intended for reception, where the pending request packet and the response packet intended for reception are to be received at one time, then all of the response packets will not be received, and the receiving device can be designed to receive only the request packet intended for transmission.

Therefore, even when the pending request packet and the response packet intended for reception are formed at the same time and are to be continuously received, since an empty volume is maintained in the receiving buffer which can store insofar as is possible, all of the response packets, all of the response packets can be continuously received.

In particular, if the data volume of the pending request packet is large, even if the response packet intended for reception is received and the empty volume of the receiving buffer is small, since that empty volume larger than the data volume of the response packet it is intended to receive, a reception denied condition at the receiving device of the response packet that it is intended to receive can be eliminated.

Thus, since there are no repeated reception denials and reattempts at the receiving device, and a reduction in the efficiency of the data transmission can be eliminated.

REFERENCE NUMERALS AND SYMBOLS AS SHOWN IN THE DRAWINGS

1 Data processing device
2 Packet processing device
3, $13_1$ to $13_3$. Packet transmitting device (transmitting device)
4 Packet receiving device (receiving device)
6 IEEE 1394 bus (serial bus)
7 Receiving buffer
8, 18 Comparator
9 Calculator
10, 20 Deciding circuit

DESCRIPTION OF THE EMBODIMENTS

An explanation is given in regard to embodiments of the present invention with reference to the FIGS.

Figure 1:
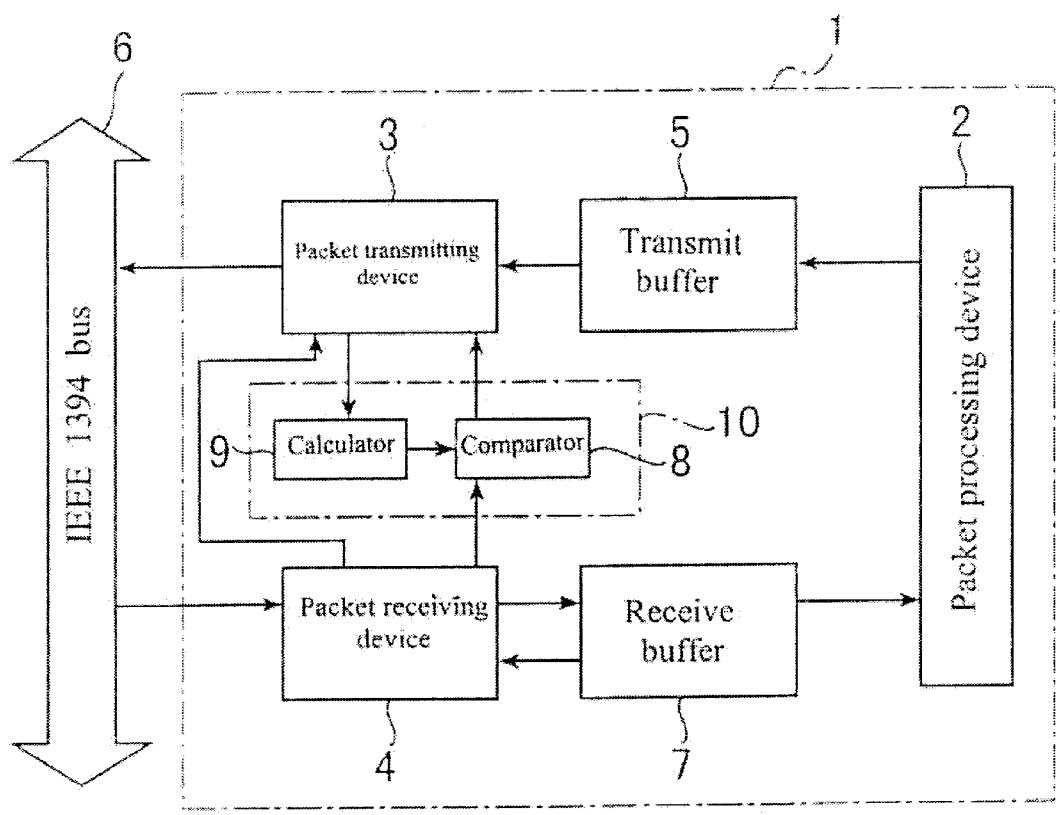
FIG. 1 is a diagram explaining a data processing device of a configuration embodiment of the present invention

Reference numeral 1 of FIG. 1 is a data processing device 1 of the present embodiment. This data processing device 1 is connected to an IEEE 1394 bus 6. A plurality of other data processing devices are also connected to this IEEE 1394 bus 6, said data processing device 1 transmits request packets to the other data processing devices by means of the IEEE 1394 bus 6, a plurality of response packets are generated at the other data processing devices to which the request packets are transmitted, and said data processing device is designed to be able to acquire a series of response packets.

This data processing device 1 has a packet processing device 2, a packet transmitting device 3, a packet receiving device 4, a transmitting buffer 5, a receiving buffer 7, and an evaluation circuit 10.

The output of the packet processing device 2 is connected to the input of the transmitting buffer 5, the output of the transmitting buffer 5 is connected to the input of the packet transmitting device 3, and the output of the packet transmitting device 3 is connected to the IEEE 1394 bus 6.

In this type of data processing device 1, at the time of transmitting a request packet, first, the packet processing device 2 forms request packages one after the other, and outputs them one after the other to the transmitting buffer 5.

The transmitting buffer 5 is made up of a FIFO memory, and when request packets are input one after the other from the packet processing device 2, it temporarily stores these request packets.

Packet transmitting device 3 first reads out on request packet from transmitting buffer 5 and sends it out to IEEE 1394 bus 6. After packet transmitting device 3 sends out the request packet, it is switched to a receiving standby state and will not send out a new request packet until it is informed from packet receiving device 4 that the response packet corresponding to the request packet has been received.

On the other hand, when a request packet is transmitted to the IEEE 1394 bus 6, the other data processing device (hereinafter the data processing device of the other party) that is specified in response to the content of the request packet receives the request packet from the IEEE 1394 bus 6, and reads out those contents. The data processing device of the other party, in response to the content of the request packet, generates a response packet that is an answer to the request packet, and transmits it to the IEEE 1394 bus 6.

The input of the packet receiving device 4 is connected to this IEEE 1394 bus 6, the input of the receiving buffer 7 is connected to the output of the packet receiving device 4, and the output of the receiving buffer 7 is connected to the input of the packet processing device 2.

When the response packet arrives at the packet receiving device 4, the packet receiving device 4 determines whether or not the response packet is receivable based on the empty volume of the receiving buffer 7. In the present invention, the term "receive" indicates process that takes place during the time of the arrival of the response packet at the packet receiving device until it is stored in the receiving buffer.

Also, when the empty region in the receiving buffer 7 is such that the response packet can be stored, the packet receiving device 4 determines that the response packet is receivable, and receives the response packet from the IEEE 1394 bus.

Then, the packet receiving device 4 accepts the response packet from the IEEE 1394 bus 6, and along with outputting that response packet to the receiving buffer 7, communicates to the packet transmitting device 3 the fact that the response packet has been received. When the fact that the response packet has been received is communicated to the packet transmitting device 3 that was in a receive standby condition, the receive standby condition of the packet transmitting device 3 is released. However, it is made so that when a transmit inhibit control command (to be explained below) is input to the packet transmitting device 3, even if the receive standby condition is released, the transmission of the request packet it is intended to transmit cannot be done.

The receiving buffer 7 temporarily stores the response packet that was input in a memory that is internally provided (not illustrated). During the time that the receiving buffer 7 stores the response packet, at the transmitting buffer 5, the request packet that it is to be transmitted after this (hereinafter, called the request packet it is intended to transmit) is being held, and is output to the packet transmitting device 3.

The packet transmitting device 3, when the request packet it is intended to transmit is input, outputs its data volume to a calculator 9.

The calculator 9, from the size of the data that was input, finds the data volume of the response packet (hereinafter, called the response packet it is intended to receive) corresponding to that request packet and outputs to one of the input terminals of comparator 8.

On the other hand, inside the packet receiving device 4, a detecting circuit (not illustrated) is provided. This detecting circuit continuously detects the empty volume of the memory inside the receiving buffer 7, and outputs the detected empty volume to another input of a comparator 8.

The comparator 8 compares the data volume of the response packet it is intended to receive with the empty volume of the receiving buffer 7. If the empty volume of the receiving buffer 7 is large enough to receive the response packet it is intended to receive, the request packet is transmitted, but if the empty volume of the receiving buffer 7 is smaller than the data volume of the response packet it is intended to receive because a response packet that has been received is still stored in the receiving buffer 7, the comparator 8 outputs a command control for transmit inhibit to the packet transmitting device 3. Due to this transmit inhibit control command, even if the packet transmitting device 3 releases the receive standby condition, the transmission of the request packet it is intended to transmit will not be performed.

After that, when the response packet that has been completely received by the receiving buffer 7 is output to the packet processing device 2, and the memory region which the response packet that has been completely received has occupied is released, the empty volume of the memory of the receiving buffer 7 increases.

When the empty volume of the memory is increased in this manner and has become larger than the data volume of the response packet it is intended to receive, the comparator 8 outputs a control command for permission to transmit to the packet transmitting device 3. When the transmit permission control command is input, the packet transmitting device 3 transmits the request packet it is intended to transmit to the IEEE 1394 bus 6.

In this way, in the data processing device 1, when the empty volume of the receiving buffer 7 is less than the data volume of the response packet it is intended to receive, the packet transmitting device 3 is not able to transmit the request packet. Therefore, the waste use of the bus by repeated reattempts can be eliminated.

Thus far, the explanation was given in regard to a data processing device 1 having one packet transmitting device, but there are also instances where several packet transmitting devices are provided to make provisions for when the volume of request packets being transmitted is large. Below, with reference to FIG. 2, an explanation is given in regard to a data processing device having a plurality of packet transmitting devices.

Figure 2:
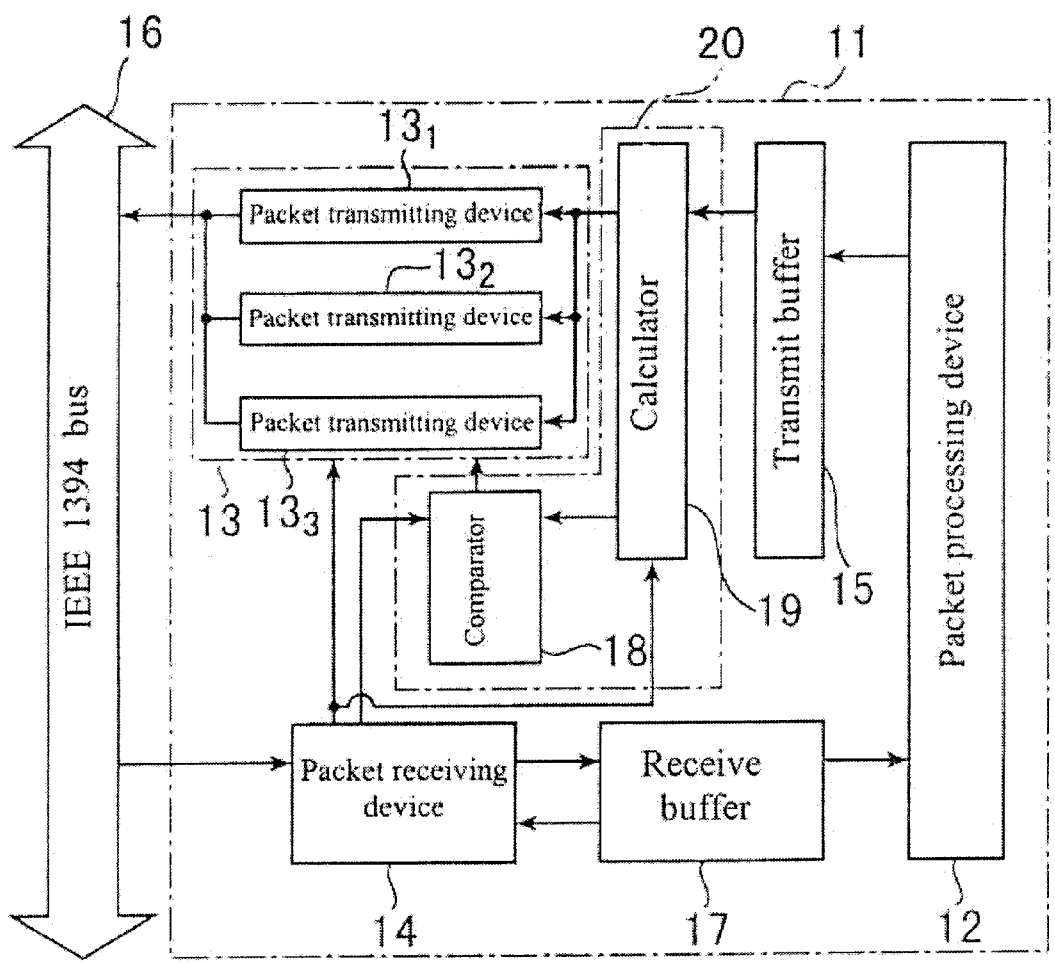
FIG. 2 is a diagram explaining a data processing device of a configuration embodiment of the present invention having a plurality of packet transmitting devices.

Reference numeral 11 of FIG. 2 shows a data processing device of another embodiment. This data processing device 11 is the same as the data processing device 1 of FIG. 1 in that it has a packet processing device 12, a packet receiving device 14, a transmitting buffer 15, a receiving buffer 17, and an evaluation circuit 20, but is different than the data processing device 1 of FIG. 1 in that it has a dispatcher 19, and the dispatcher 19 is arranged between the transmitting device 13 and the transmitting buffer 15, and in that the transmitting device 13 has a plurality of packet transmitting devices $13_1$–$13_3$. Here, it is assumed that the transmitting device has three packet transmitting devices $13_1$–$13_3$.

Also, the output of the packet processing device 12 is connected to the input of the receiving buffer 15, the output of the transmitting buffer 15 to the input of the dispatcher 19, and the output of the dispatcher 19 to the transmitting device 13, and the output of the transmitting device 13 is connected to an IEEE 1394 bus 16.

In a data processing device 11 with the above type of construction, in sequentially transmitting one after another a plurality of request packets, first, the packet processing device 12 sequentially generates a plurality of request packets, and sequentially outputs them to the transmitting buffer 15.

Figure 3:
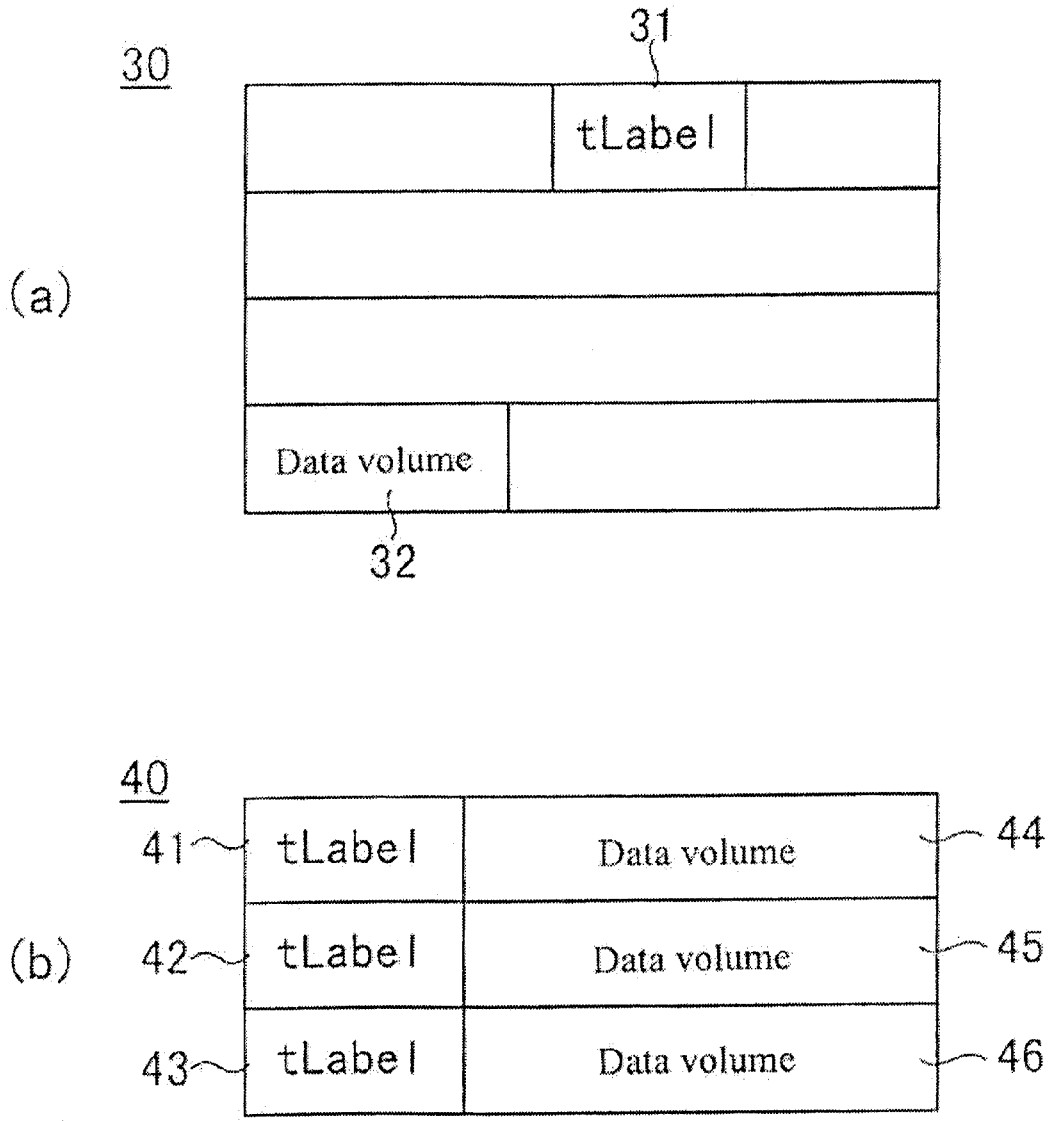
FIG. 3 consists of (a): A diagram explaining the format of a request packet, and (b): a diagram explaining the memory region in the dispatcher.
Figure 4:
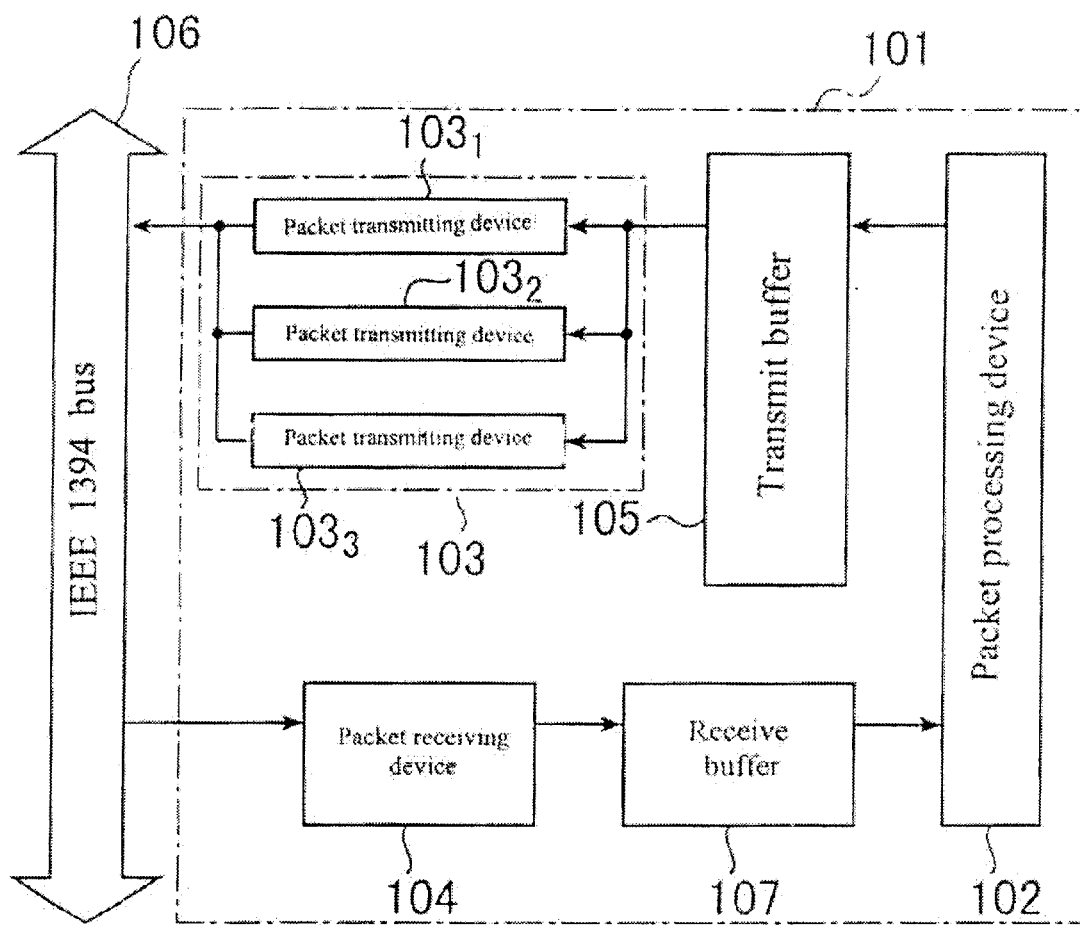
FIG. 4 is a diagram explaining a conventional data processing device

A summary of a general format of a request packet conforming to the IEEE 1394 standards is shown at key 30 of FIG. 3(a). This request packet has a first packet region 31 and a second packet region 32, and the tLabel and the data volume are respectively recorded in these. Among these, the label is an intrinsic tag that is allocated to each unresolved transaction such as the request packet and response packet that are transmitted from each machine, and is a number for the purpose of attaching a correspondence to the request packet and the response packet. Also, the data volume are data showing the total data volume of one request packet.

When request packets having this type of format are input to the transmitting buffer 15, the dispatcher 19 reads out these request packets one after another in the sequence in which they were input to the transmitting buffer 15, and the tLabel and the data volume are respectively acquired from the first and second packet regions 31, 32 of the request packets. Here, it is assumed that initially three request packets are read, and that the tLabel and the data volume of each request packet that has been read are acquired.

The dispatcher 19 finds the data volumes of the response packets corresponding to those requests packets from the data volumes of these requests packets for which an attempt is being made to transmit, forms the respective tLabels and data volumes into sets, and writes them to a memory region which the dispatcher 19 has.

One example of a memory region which the dispatcher 19 has is shown at key 40 of FIG. 3(b). This memory region 40 has the first to sixth regions 41 to 46.

The tLabel for each request packet that is transmitted from each packet transmitting device $13_1$–$13_3$ are written to the first to third regions 41 to 43, the data volume of the response packets that are generated in response to the request packets that are transmitted from each packet transmitting device $13_1$–$13_3$ are written and in the fourth to sixth regions 44 to 46, respectively.

In this way, the tLabel for each request packet that is written to the first to third regions 41 to 43 and the data volume for each response packet that is written to the fourth to sixth regions 44 to 46, respectively, have a one-to-one correspondence attached, and are made so as to become one set.

Also, later, the fact that a response packet corresponding to the request packet has been received is communicated to the dispatcher 19, and a set of the tLabel for that request packet and the data volume for the response packet are made so as to be deleted from the memory region 40.

Also, when the tLabel for each request packet and the data volume for the response packet corresponding to each request packet are respectively written to the memory region 40, the dispatcher 19 is made so as to uniformly output the request packets to the packet transmitting devices $13_1$–$13_3$. Here, since three request packets are read, each request packets is output to the packet transmitting devices $13_1$–$13_3$.

Each transmitting device $13_1$–$13_3$ outputs the request packet that has been input to the IEEE 1394 bus 16. Each packet transmitting device $13_1$–$13_3$ enters a receive standby condition and do not transmit a new request packet until it has been confirmed that the response packets corresponding to the request packets that were transmitted have been received at the packet receiving device 14.

When the request packets have been transmitted from each packet transmitting device $13_1$–$13_3$ to the IEEE 1394 bus 16, other data processing devices that are specified in response to the contents of each request packet receive the request packets from the IEEE 1394 bus 16.

Here, it is assumed that the same data processing device sequentially generates three response packets corresponding to the three response packets that were transmitted from the packet transmitting devices $13_1$–$13_3$. The response packets corresponding to the request packet that was transmitted from the packet transmitting device $13_1$ is assumed to have been transmitted first to the IEEE 1394 bus 16, and it is assumed that the response packets corresponding to the request packets that were transmitted from the packet transmitting devices ($13_2$, $13_3$) are pending transmission to the IEEE 1394 bus 16.

The input of the packet receiving device 14 is connected to this IEEE 1394 bus 16, and the input of the receiving buffer 17 is connected to the output of the packet receiving device 14, and the output of the receiving buffer 17 is connected to the input of the packet processing device 12.

When the response packet from the IEEE 1394 bus 16 arrives at the packet receiving device 14, the packet receiving device 14 determines whether or not the response packet can be received according to the empty volume of the receiving buffer 17.

The packet receiving device 14 determines that the response packet can be received if the empty volume in the receiving buffer 17 is equal to or greater than the volume of the response packet. Also, the packet receiving device 14, along with output of the response packet that has arrived from the IEEE 1394 bus 16 to the receiving buffer 17, sends a message to the packet transmitting device 13$_1$ and the dispatcher 19 with the information that the response packet has been received.

When the acknowledgement of the reception of a response packet is received, the receive standby condition of the packet transmitting device 13$_1$ is released. However, when the control command for transmission inhibit explained below is input to the packet transmitting device 13$_1$, the transmission of a request packet to be transmitted cannot be done even in the event the receive standby condition has been released.

On the other hand, when acknowledgement of the reception of a response packet is received, the dispatcher 19 deletes the tLabel of the request packet corresponding to the received response packet and the data volume of the above-mentioned response packet from the first and fourth regions 41, 44 of the memory region 40.

The receiving buffer 17 temporarily stores the received response packet. When the receiving buffer 17 is holding the received response packet, the request packet to be transmitted next (hereinafter called the request packet to transmitted) is output from the transmitting buffer 15 to the dispatcher 19.

The dispatcher 19 reads the tLabel and data volume from the request packet to be transmitted, calculates the data volume of the response packet corresponding to the request packet to be transmitted (hereinafter, called the response packet to be received), relates the tLabel to the data volume, generates a set with the values, and writes the set into the first and fourth regions 41, 44 of the memory region 40.

When this is done, the tLabel of the request packets that have been transmitted from the respective packet transmitting devices 132, 133, and are pending at the packet receiving device 14 (hereinafter called the not yet received request packets), the data volume of the pending request packets corresponding to the request packets, and the data volume of the response packet to be received, are written into the memory region 40.

The dispatcher 19 reads the data volume of the pending request packet that has been written into the memory region 40, and the data volume of the response packet to be received (hereinafter called the total data volume of the pending and intended-for-reception response packets). The data volume of the pending and intended-for-reception response packets is input to one of the inputs of the comparator 18.

At the packet receiving device 14 there is a detecting circuit (not illustrated) and the empty volume of the receiving buffer 17 is detected continuously. The empty volume of the receiving buffer 17 that has been detected by the detecting circuit is input to the other input of the comparator 18.

The comparator 18 continuously compares the data volume of the pending and intended-for-reception response packets and the empty volume of the receiving buffer 17.

At this point in time, it is assumed that the pending response packets that are the response packets corresponding to the request packets transmitted from the packet transmitting devices 13$_2$, 13$_3$, and that the response packets intended for reception are the response packets corresponding to the request packets transmitted from the packet transmitting devices 13$_2$, 13$_3$.

If the empty volume of the receiving buffer 17 is larger than the data volume of the pending and intended-for-reception response packets, the comparator 18 outputs a control command for transmit permission to the packet transmitting device 13$_1$. When this control command is input, the packet transmitting device 13$_1$ transmits the request packet intended for transmission to the IEEE 1394 bus 16.

On the other hand, if the empty volume of the receiving buffer 17 is smaller than the data volume of the pending and intended-for-reception response packets, the comparator 18 outputs a control command for transmission inhibit to the packet transmitting device 13$_1$.

Due to this control command, even if the receive standby condition is released, the packet transmitting device 13$_1$ cannot transmit the request packet intended for transmission.

In the past, when the pending response packets corresponding to the request packets that are transmitted from the packet transmitting devices 13$_2$, 13$_3$ are received at the packet receiving device 14, the empty volume of the receiving buffer 17 is reduced and the response packets intended for reception cannot be received, but with the present invention, when the empty volume of the receiving buffer 17 becomes smaller than the data volume of the response packet intended for reception, since the request packet intended for transmission cannot be output, when the request packet intended for transmission is transmitted, there is always an empty volume in the receiving buffer 17 equal to the data volume of the response packet intended for reception.

Therefore, when the request packet intended for transmission is transmitted, the response packet intended for reception can always be received.

When a received response packet is output to the packet processing device 12 from the receiving buffer 17, and the memory region occupied by the received response packet is released, the empty volume of the receiving buffer 17 increases. If the empty volume of the receiving buffer 17 increases in this manner, and becomes greater than the total data volume of the pending and intended-for-reception response packets, the comparator 18 outputs a control command for transmission permission to the packet transmitting device 13$_1$.

Later, when the pending request packet is received at the packet receiving device, the receive standby condition of the packet transmitting devices 13$_2$, 13$_3$ is released, but each packet transmitting device 13$_2$, 13$_3$, in the same manner as the packet transmitting device 13$_1$, cannot transmit a new request packet until a control command for transmission permission is output.

As explained above, in the data processing device 11, the data volume of the pending and intended-for-reception response packets calculated by the dispatcher 19 and the empty volume of the receiving buffer 17 are compared at the comparator 18, and when the empty volume of the receiving buffer 17 is smaller than the data volume of the pending and intended-for-reception response packets, even though the packet transmitting devices 13$_1$–13$_3$ are not set in a receive standby condition, the request packet intended for reception cannot be transmitted, and when the empty volume of the receiving buffer 17 is greater than the data volume of the pending and intended-for-reception response packets, the request packets intended for transmission can be transmitted.

Because of this, even if the pending response packet and the response packet intended for reception appear simultaneously, they can be received one after the other, and when the request packet intended for transmission is transmitted, since there is an empty volume in the receiving buffer 17 equal to the data volume of the pending and intended-for-reception response packets, all of the response packets can be received one after the other. By this means, even if the pending response packets are received, the conditions of the empty volume of the receiving buffer 17 becoming too small, and the response packet intended for reception not being able to be received are eliminated.

Therefore, since the retransmission from another data processing device of a response packet that was denied reception is eliminated, the bus is not used wastefully by a "busy" acknowledgement being returned to the other data processing device and a reattempt being repeated by the other data processing device.

The data processing device 11 of FIG. 2 is a device with three packet transmitting devices $13_1$–$13_3$, but the present invention is not limited to this configuration, and it can be a device having any number of packet transmitting devices. A number of regions corresponding to the number of packet transmitting devices is provided in the memory region 40 within the dispatcher 19, and each packet transmitting device corresponds to one region, and the tLabels and the data volumes can be written in the respective regions.

Also, the writing to the memory regions is not limited to tLabels, for example, machine numbers that are respectively allocated for the purpose of recognizing each packet transmitting device $13_1$ –$13_3$, and sets of data volumes for the response packets can also be written into the memory region.

Since the transmission of a request packet is always possible, when an request packet intended for transmission even when the empty volume of the receiving buffer is too small and the response packet cannot be received, a reduction in the efficiency of the data exchange, wherein the serial bus is used wastefully due to denied reception at the receiving device and a necessary reattempt, can be avoided.

What is claimed is:

1. A data processing device comprising,
   a transmitting device connected to a serial bus for transmitting request packets via the serial bus to another device connected to the serial bus;
   a receiving device connected to the serial bus for receiving a response packet from the other device via the serial bus, the response packet corresponding to the request packet;
   a receiving buffer for temporarily storing the response packet supplied from the receiving device;
   an evaluation unit that determines the relationship between the data volume of the response packet requested by the request packet and the available volume of the receiving buffer;
   wherein the evaluation unit holds up the transmission of a request packet over the serial bus by the transmission device of the data processing device to the other device connected to the serial bus if it determines that insufficient data volume for the response packet is available in the receiving buffer.

2. The data processing device of claim 1 wherein each data processing device comprises a plurality of the transmitting devices, and wherein the evaluation unit determines the relationship between the total volume of the response packet requested by the request packet to be sent from each of the transmitting devices and the volume available in the receiving buffer, and the evaluation unit holds up the transmission, via the serial bus, of the request packet if the evaluation unit determines that insufficient data volume is available in the receiving buffer for the data in the response packet for that request.

3. The data processing device of claim 1 wherein the request packet, the response packet, and the serial bus, are designed to conform to IEEE 1394 standards.

4. The data processing device of claim 2 wherein the request packet, the response packet, and the serial bus, are designed to conform to IEEE 1394 standards.

* * * * *